United States Patent [19]

Perry et al.

[11] Patent Number: 5,091,021
[45] Date of Patent: Feb. 25, 1992

[54] MAGNETICALLY CODED DEVICE AND METHOD OF MANUFACTURE

[75] Inventors: Thomas A. Perry, Washington; John R. Bradley, Centerline; Thaddeus Schroeder, Rochester Hills; Carlton D. Fuerst, Royal Oak, all of Mich.

[73] Assignee: General Motors Corporation, Detroit, Mich.

[21] Appl. No.: 589,359

[22] Filed: Sep. 28, 1990

[51] Int. Cl.$^5$ .............................................. H01F 1/02
[52] U.S. Cl. ................................ 148/103; 219/121.17; 219/121.66
[58] Field of Search ..................... 219/121.16, 121.17, 219/121.65, 121.66; 324/207.22; 29/602.1; 148/101, 103

[56] References Cited

U.S. PATENT DOCUMENTS

| 4,312,684 | 1/1982 | Chraplyvy et al. | 148/121 |
| 4,347,086 | 8/1982 | Chraplyvy et al. | 148/101 |

FOREIGN PATENT DOCUMENTS

| 354280 | 6/1986 | Fed. Rep. of Germany | 148/101 |

OTHER PUBLICATIONS

Ara et al., "Formation of Magnetic Grating on Steel Plates by Electron/Laser Beam Irradiation", *IEEE Transactions on Magnetics*, vol. 25, No. 5, Sep. 1989, pp. 3830-3832.

Bradley et al., "Microstructure and Magnetic Properties of $CO_2$ Laser Surface Melted Nd-Fe-B Magnets", *Journal of Magnetism and Magnetic Materials*, vol. 86, Apr. (1990), pp. 44-50.

Croat et al., "Crystallization of Amorphous $Pr_{0.27}Co_{0.73}$: Magnetic Properties and Laser-Induced Coercivity", *Appl. Phys. Lett.*, vol. 37, No. 10, 15 Nov. 1980, pp. 962-964.

Gambino (editor), "Optical Storage Disk Technology", *MRS Bulletin*, vol. XV, No. 4, Apr. 1990, pp. 20-22.

Greidanus et al., "Magneto-Optical Storage Materials", *MRS Bulletin*, vol. XV, No. 4, Apr. 1990, pp. 31-39.

Hansen, "Magneto-Optical Recording Materials and Technologies", *Journal of Magnetism and Magnetic Materials*, vol. 83, Jan. (1990), pp. 6-12.

Herbst et al., "Laser Annealing and Selective Magnetization of Manganese-Aluminum Alloys", *Appl. Phys. Lett.*, vol. 37, No. 8, 15 Oct. 1980, pp. 753-754.

Kryder, "Advanced in Magneto-Optic Recording Technology", *Journal of Magnetism and Magnetic Materials*, vol. 83, Jan. (1990), pp. 1-5.

Lunney et al., "Enhanced Corrosion Resistance of $Fe_{40}Ni_{38}Mo_4B_{18}$ and $Nd_{15}Fe_{77}B_8$ by Laser Glazing", *SPIE*, vol. 1023 Excimer Lasers and Applications (1988), pp. 216-223.

Weller-Brophy et al., "Materials Challenges in Integrated Optical Recording Heads", *MRS Bulletin*, vol. XV, No. 4, Apr. 1990, pp. 25-30.

*Primary Examiner*—John P. Sheehan
*Attorney, Agent, or Firm*—George A. Grove

[57] ABSTRACT

Nonmagnetized permanent magnet material is heated in a pattern by a laser beam to a localized temperature above the Curie point or a temperature sufficient to reduce the coercivity sufficiently for an external field to magnetize the pattern in the direction of the field. Magnets so produced can have very high pole density, digital encoding and analog patterns having gradually varying local field strength. Alternating pole magnets of this type can be used for stepper motor magnets.

11 Claims, 2 Drawing Sheets

MAGNETICALLY CODED DEVICE AND METHOD OF MANUFACTURE

FIELD OF THE INVENTION

This invention relates to a method of forming a magnetically coded pattern in a permanent magnet material and the resulting device, particularly where the microstructure of the material is not affected by the magnetic coding process.

BACKGROUND OF THE INVENTION

In automotive and other industrial applications, special sensors are used to determine shaft speed and angular position, for example, as well as linear motion sensing. Generally such sensors are of the variable reluctance variety and comprise a toothed wheel spaced from a sensor comprising a magnet and a magnetoresistor or a Hall effect device. Other types of sensors require multi-bit digital encoding for position sensing and other uses.

A permanent magnet with an appropriate magnetization pattern can serve as the exciter component of a magnetoresistive sensor without the need for a separate bias magnet. However, by conventional production methods currently in use, very small magnet exciters could not be magnetized with a pattern providing the necessary resolution, and the cost of a large permanent magnet exciter would be prohibitive. If several different magnetization patterns are desired side by side, such as for multi-bit digital encoding, more complex manufacturing problems arise; either machining or magnetizing such an exciter as one unit is very costly and is seldom done.

It has been proposed in U.S. Pat. No. 4,312,684 to Chraplyvy et al entitled "Selective Magnetization of Manganese-Aluminum Alloys" and in U.S. Pat. No. 4,347,086 to Chraplyvy et al entitled "Selective Magnetization of Rare-Earth Transitional Metal Alloys", both assigned to the assignee of the present invention, to create local regions of hard magnetic material in a substrate of a special non-magnetic or soft magnetic material by exposing selected regions of the substrate to a laser beam for heating such regions to a transformation temperature at which magnetic material is formed. The magnetic regions are magnetized in a strong field to produce a permanent magnetic code having sufficient flux density to be readable with a magnetic sensor such as a magnetic tape head. The materials used are expensive and the magnetic fields produced are too weak for sensing by non-contact sensors at a distance greater than about 380 $\mu$m.

In addition, the paper of Ara et al, "Formation of Magnetic Grating on Steel Plates by Electron/Laser Beam Irradiation", IEEE Trans. Magnetics, Vol. 25, No. 5 (1989), p. 3830, discloses an attempt to make a magnetic sensor by forming magnetic gratings on non-magnetic austenitic stainless steel by laser beam heating of strips on the plate to a temperature sufficient to effect transformation of the heated regions to produce small grains of the ferromagnetic phase in the austenitic phase, and similarly heating a ferromagnetic carbon steel having a ferrite/pearlite phase which was changed to martensite by beam irradiation. The gratings were magnetized and the magnetic flux from each track was detected by a sensor passed over the grating. The signal produced was far too weak to be useful in many applications.

It has also been proposed to alter the magnetic properties of very thin films of special materials for data storage by a thermomagnetic method. In the recording of a magneto-optical disc, a thin layer (about 1 $\mu$m thick) of an amorphous transition metal-rare earth alloy is coated on a disc and the entire disc is magnetized in a given direction. A laser is then used to locally heat the surface (typically a 1.6 $\mu$m diameter spot) in a static applied magnetic field to reverse the direction of the disc's magnetization in the heated region. Because the magnetic regions are so small and magnetically weak, a magnetic sensor such as a magnetoresistor or a Hall effect device cannot respond to the individual bits of data. The data is read optically using the Kerr effect. This requires a beam-splitter, two detectors, two linear polarizers, a half-wave plate and beam steering optics. The delicate and complex nature of the detection optics precludes this type of magneto-optical recording from forming the basis of a viable automotive sensor.

SUMMARY OF THE INVENTION

It is therefore an object of the invention to provide a thermomagnetic method of producing bulk magnets with patterned magnetic fields readable by a magnetic sensor at a practical spacing and capable of providing a small, low cost magnet with narrow, closely spaced poles. Another object is to provide such a method for producing digital patterns as well as analog patterns having gradually varying field strength in bulk magnets. It is another object to provide the bulk magnets made by such a process.

The invention is carried out by a method of imparting a magnetic pattern to a bulk permanent magnet material comprising the steps of: directing energy in a pattern onto unmagnetized base permanent magnet material having a minimum thickness on the order of 1 mm to heat a volume of the material to a threshold temperature to lower the coercivity thereof; selectively magnetizing the pattern by imposing on the pattern a magnetic field greater than the coercivity of the heated volume; and allowing the material to cool, whereby the treated pattern generates a magnetic flux density which is readily detected by a magnetic sensor.

The invention is further carried out by a patterned magnet comprising an unmagnetized substrate of a permanent magnet material having a minimum thickness on the order of 1 mm and a magnetized pattern extending to a controlled depth from the substrate surface and made by the process of: directing energy onto the unmagnetized substrate surface in a pattern to heat a volume of the material to lower the coercivity to the controlled depth; imposing a magnetic field on the heated pattern sufficient to magnetize the substrate in the heated volume; and cooling the treated pattern.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

In the ensuing description, the term "bulk" is used to distinguish from thin film and very thin film devices. The minimum thickness of a bulk magnet or material is on the order of 1 mm and may be several centimeters thick. Various permanent magnet materials are used as the starting material for the method of the invention. The method has been successfully used on ferrites, alnico materials, and Magnequench (TM) materials and no magnetic materials have been tried without success. The chief requirement of the starting permanent magnet material is that it have a strong coercivity dependence on temperature so that local regions can be heated and magnetized without magnetizing the surrounding bulk material. Generally, the coercivity decreases as the temperature increases until the Curie temperature is attained. The temperature required for the process depends on the strength of the magnetizing field. There are some magnetic alloys, however, which exhibit a more complicated magnetic behavior as a function of temperature and heating to a temperature below the Curie point is sufficient to effect a magnetic change. For example, $Nd_2Co_{14}B$ exhibits a spin reorientation phase transition at a temperature $T_s$. Below $T_s$ such materials exhibit an axial easy direction; above $T_s$ the moments will rotate freely in the basal plane. Thus, the Curie temperature need not be reached to apply the patterning process to either type of material.

The material MQ1 and MQ2 are NdFeB-based alloys having a high energy product and are trademarked products of General Motors Corporation. The U.S. Pat. No. 4,792,367 to Lee, assigned to the assignee of this application, discloses the MQ2 material which is a rare earth-iron-boron based alloy that may include other suitable alloying constituents such as cobalt. The preferred methods of forming permanent magnets from that material include overquenching a molten mixture of the precursors by melt spinning to obtain an amorphous or very finely crystalline material having little intrinsic coercivity and then hot pressing to promote crystal growth to the optimum size for the desired hard magnetic properties; alternatively, the material is hot pressed and hot worked to form the desired fine grained recrystallized microstructure consisting mainly of an $Nd_2Fe_{14}B$-type phase. An intrinsic room temperature coercivity exceeding 15 kOe is obtained along with very high remanence and high energy product. MQ1 magnets are made of a powdered form of a similar annealed material held together by epoxy bonding.

Figure 1:
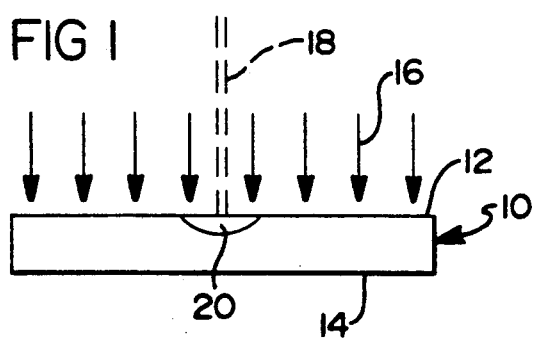
FIG. 1 is a schematic view of a substrate being magnetically patterned by the process according to the invention.

The method of patterning a magnet may be applied to a bulk permanent magnet of any shape, e.g., a plate, a disc or an annulus. This is exemplified in FIG. 1 as a flat plate or substrate 10 of unmagnetized or demagnetized permanent magnet material having an upper surface 12 and a lower surface 14. The substrate 10 is placed in a magnetic field 16. A laser beam 18 is then used to impinge of the surface 12 in a pattern to heat a volume 20 in which the coercivity is lowered from that of the bulk material to a value below the field strength. The magnetic field magnetizes the heated volume as it cools and regains its coercivity; thus, the pattern becomes a permanent magnet. The direction of the magnetic field determines the polarity of the magnet and by changing the field direction different parts of the pattern can have different polarities. In this way it is possible to write a grating or other pattern of enhanced magnetic field strength regions on the surface without altering the microstructure of the material. It should be noted that when the pattern of enhanced field strength is generated at a temperature below the Curie temperature, the applied external field strength must be large to get a high degree of polarization of the region. This strong applied external field will also tend to increase the alignment of the moment in the non-heat affected zones of the substrate. To achieve maximum contrast, it is necessary to use a moderate field strength at a pattern temperature above the Curie point.

Experimental tests employed samples of Magnequench and hard ferrite permanent material. MQ1 samples were in the form of flat 1.4 mm thick wafers, and MQ2 samples were cut from larger blocks of material to various thicknesses varying from 9 mm to 0.9 mm. The Curie temperature of Magnequench material is about 312° C. The hard ferrite samples were of the sintered $BaO-6Fe_2O_3$ type. Each sample was 6.2 mm thick and ring-shaped with an inside diameter of 18.5 mm and an outside diameter of 43.5 mm. The Curie temperature of the ferrite material is about 450° C. All these samples were thermally demagnetized or obtained in an unmagnetized state.

EXAMPLE 1

Figure 2:
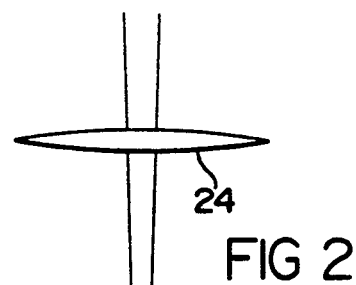
FIG. 2 is a schematic view of one embodiment of apparatus for processing a substrate according to the invention.

The apparatus shown in FIG. 2 was used to demonstrate the method of the invention in a simple form. A flat MQ2 magnet 10 measuring 19 mm × 14 mm × 9 mm was surface ground and thermally demagnetized by heating to 350° C. for 30 minutes in a vacuum furnace. After cooling, an argon ion laser operating in "all lines mode" was used to scan the surface of the sample through a mirror 22. A 350 mm focal length lens 24 was used to produce a slightly defocused beam diameter of about 150 μm incident on the surface of the substrate. The laser operated at a power of 6 W measured near the sample. A motorized translation stage (not shown) was used to move the sample in front of the stationary beam at a rate of 0.33 mm/s (faster scan rates are desirable and equally effective). During patterning, a magnetic field having a strength of 3 kOe produced by a horseshoe magnet 26 was imposed on the sample. In this manner, the sample was covered with a grating of four laser beam modified tracks with a spacing of 2 mm between tracks.

Figure 3:
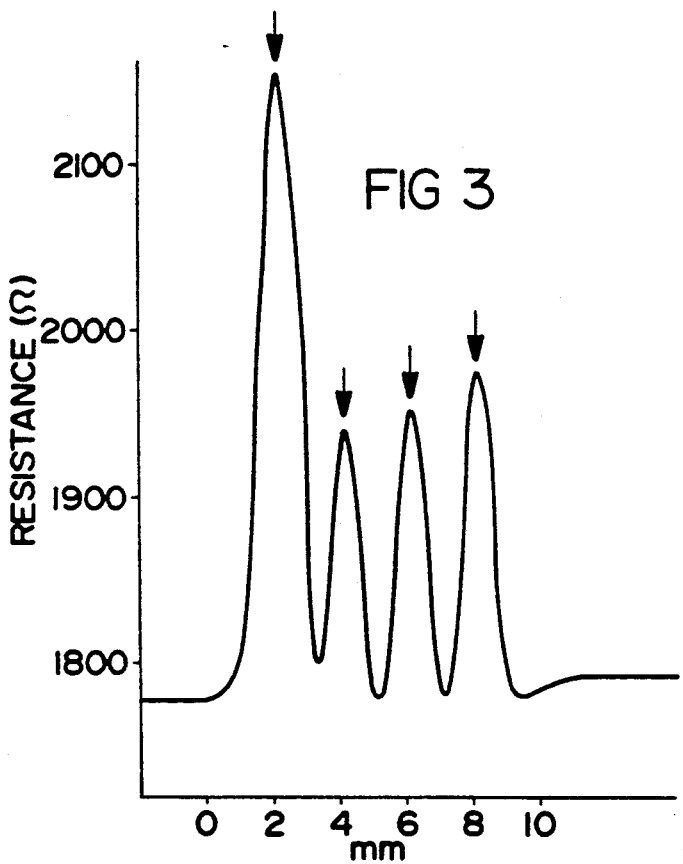
FIG. 3 is a graph of field strength of a patterned magnet according to the invention.

The sample 10 containing the grating was translated in front of an InSb magnetoresistor at a spacing of about 0.1 mm between the sample and the magnetoresistor. FIG. 3 shows the resistance of the magnetoresistor versus its position along the grating on the sample 10.

Resistance peaks marked by the arrows occur at the tracks of the grating. The peaks represent a roughly 5% to 10% increase in resistance and correspond to flux density changes up to 100 G. Stronger magnetic signal strengths than those reported here are attainable, being only limited by the geometry of the heat-affected zone and the saturation magnetization of the magnet.

EXAMPLE 2

Figure 4:
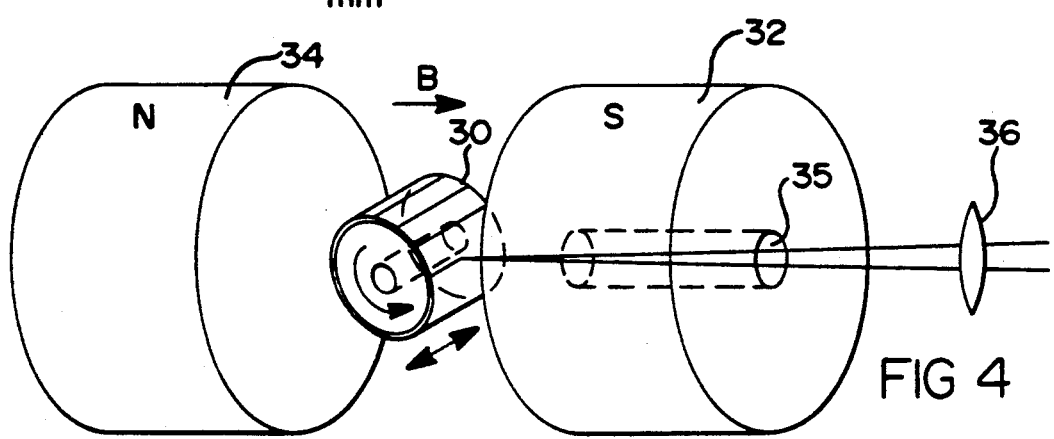
FIG. 4 is a schematic view of another apparatus for magnetically patterning a tubular substrate according to the invention.

The apparatus of FIG. 4 was used to magnetically pattern a tubular or annular sample 30 with alternating poles. A pair of spaced solenoids 32, 34 producing a magnetizing field of 1 kOe between them are spaced to accommodate the sample 30 in the field. The solenoid 32 has a central opening 35 which admits a laser beam to the sample. A tubular bonded MQ1 substrate 30 having a length of 10 mm, an inner diameter of 19 mm and an outer diameter of 21.5 mm was obtained in an unmagnetized condition. An argon ion laser operating in "all lines mode" was used to scan the surface of the sample. A 350 mm focal length lens 36 was used to produce a slightly defocused beam diameter of about 150 $\mu$m incident on the surface of the substrate. The laser operated at a power of 6 W measured near the sample. A motorized translation stage (not shown) was used to axially move the sample in front of the stationary beam at a rate of 0.33 mm/s (faster scan rates are desirable and equally effective). When a track was thus magnetized at one polarity, the sample was indexed and the magnetic field was reversed to scan the next track to magnetize it at the opposite polarity. In this manner the sample 30 was provided with 48 alternating north-south tracks. Again, stronger magnetic signal strengths than those reported here are attainable by this process.

Figure 5:
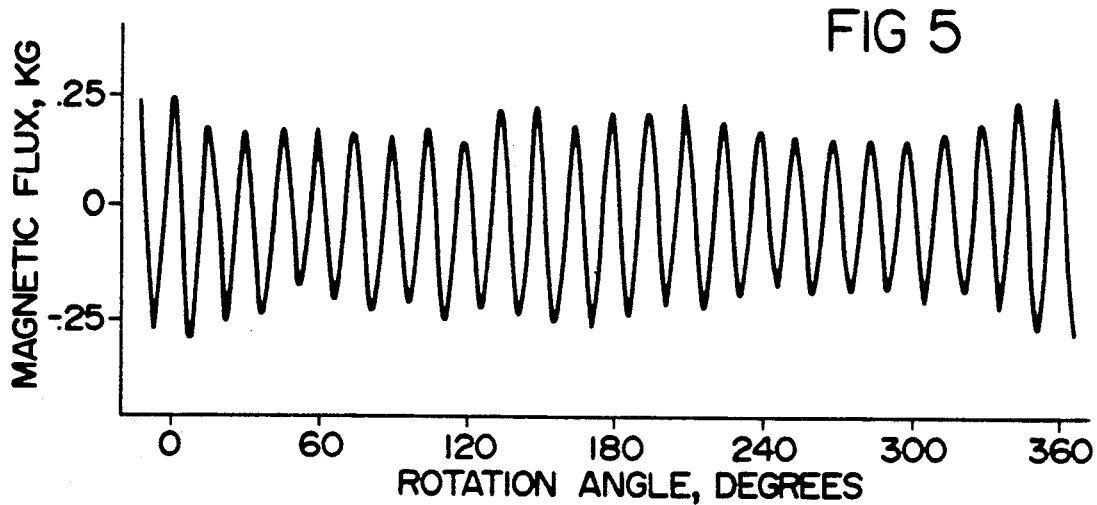
FIG. 5 is a graph of the field strength of a patterned tubular magnet processed by the apparatus of FIG. 4.

The multi-poled magnet 30 was rotated in front of a Hall-effect magnetic flux sensor at a spacing from the sensor of about 0.25 mm. The output from the Hall-effect sensor as a function of rotation angle is shown in FIG. 5. The measured field strength varied between $-250$ G at one pole and 250 G at the other pole.

Subsequent experiments performed on magnets of various thicknesses and with a narrower spacing between tracks yielded essentially the same results. For a sufficiently thin magnet (about 1 mm or less thick), processed under the conditions given above, the heat-affected zone extends to a depth which is an appreciable fraction of the total sample thickness. In those instances, the grating pattern could be read by the magnetoresistor on both the patterned and unpatterned (i.e., back side) surfaces of the magnets. It was also determined that smoothly polished and surface ground magnets work equally well.

Other combinations of laser and scanning parameters were employed with no fundamental difference in results. In some cases laser melting and some material removal occurred to produce surface channels, but the magnetoresistor response to such tracks was indistinguishable from that produced by the unmelted tracks. MQ1 samples were particularly susceptible to such melting but yielded equivalent magnetic results. Laser patterning of ferrite ring magnets also produced surface channels, and the magnetoresistor output was qualitatively similar to the Magnequench magnets, but the overall signal is smaller.

The field from the heated tracks can be made stronger by increasing the depth of heating and therefore the magnetized volume. A technique for achieving this is to simultaneously heat both sides of a thin substrate using a split laser beam to increase the effective depth without broadening the pattern width.

The external field should not be so strong as to influence the magnetization of the unheated substrate. Depending on the product being made, a low level of magnetization of the unheated bulk material may be tolerated, but in general such magnetization should be minimized.

In making patterned magnets by a conventional method, a special magnetizing fixture is made for each type of magnet and the resolution of the magnetic pattern is limited. Patterning magnets by laser processing, however, can be extremely precise, thus allowing a very high density of poles on the surface. A readily attainable density is one pole per mm with each track having a heat-affected width of 0.8 mm. With reference to a poled magnet like that produced in Example 2 having a plurality of alternating poles and yielding a field having a plurality of strong alternating flux densities, for a given number of poles on the sensor wheel, this laser process will lead to reduced wheel diameter, reduced magnet volume, lower cost and easier packaging. From the manufacturing point of view, the magnetization process is simplified as the starting blank is unmagnetized and the alternating poles are imprinted by the laser in the magnetic field. In addition, this magnetization process is highly flexible since the laser beam intensity, trajectory and scan speed can be easily controlled, for example by computer control. Therefore, the same magnetizing equipment can be used for manufacturing a variety of sensor wheels.

Figure 6:
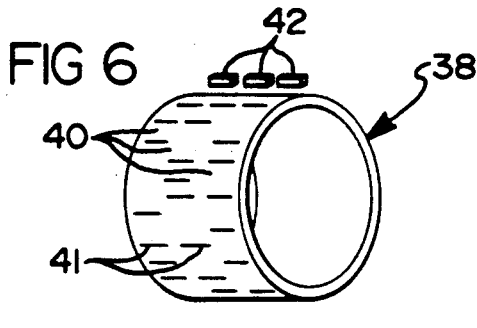
FIG. 6 is an isometric view of a multiple track digitally coded magnet made according to the invention.

Other types of patterned magnets are readily made by the laser process. Instead of making a simple grating on a wheel or plate, heating of the surface could be controlled as well as the field direction to produce any desired array of discontinuous line segments or spots thereby digitally encoding the surface of the magnet, as illustrated in FIG. 6. A code wheel 38 with three tracks 40 of digital code comprising line segments 41 or dots is read by three sensors 42 adjacent the wheel. During processing, the laser beam is swept across the wheel in an array of parallel lines and the beam is cut off or interrupted where the imprint is not desired.

Figure 7:
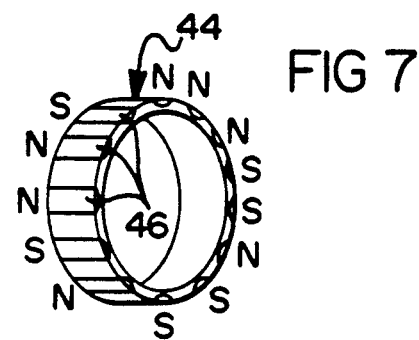
FIG. 7 is an isometric view of a coded magnet having a non-symmetrical pattern of poles according to the invention.

Still another type of encoder can be produced by the laser magnetization process. As indicated in FIG. 7, a ring or other configuration substrate 44 can be provided with magnetic tracks 46 having north and south poles in any order, that is, they do not alternate in a regular pattern. For example, the order of poles may be N, N, N, S, S, N, S, N, N, etc.

Figure 8:
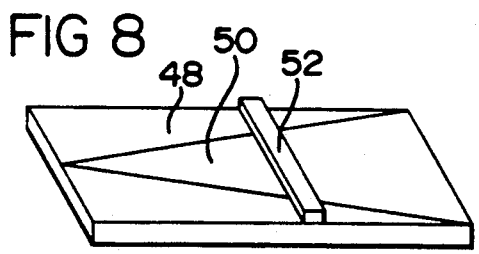
FIGS. 8, 9 and 10 are isometric and cross-sectional views, respectively, of three embodiments of an analog pattern for a magnet according to the invention.
Figure 9:
Figure 10:
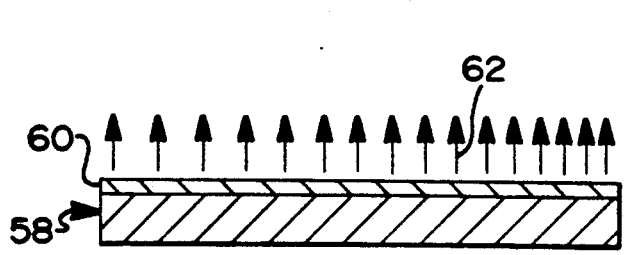

Analog magnet patterns can also be produced by the laser process. As indicated in FIG. 8, a nonmagnetic substrate 48 has a V-shaped magnetic pattern 50 treated by a laser in a magnetic field to yield a flux density which changes gradually along the pattern, becoming stronger as the pattern 50 becomes wider, for sensing by a magnetoresistive sensor 52. The sensor resistance changes as a function of the field strength and thus varies according to the relative position of the magnet and sensor. Upon relative movement of the substrate 48 and sensor 52, the sensor produces a ramp signal. This example is a potentiometer which may be imprinted on a ring substrate for a rotary potentiometer or on a flat plate for a linear potentiometer. The same effect can be obtained, as shown in FIG. 9, on a substrate 54 having a laser-treated track 56 which gradually changes in depth to yield a gradually changing field along the track. FIG. 10 shows a cross section of a substrate 58 having a heated track 60 of uniform depth and width but having a varying strength magnetic field 62 as a result of applying a varying external field during the heating of the track 60.

Figure 11:
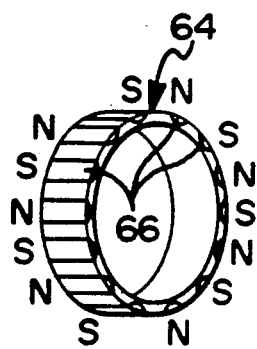
FIG. 11 is an isometric view of an alternately poled magnet for a motor armature according to the invention.

The patterned magnets, both unipolar (i.e., where all the treated areas are of the same polarity) and bipolar, are useful as digital encoders and analog devices, and moreover, the bipolar devices can be used as stepper motor magnets. A ring magnet 64, as shown in FIG. 11, having alternating poles 66 and rotor mounting means (not shown) comprises a motor armature.

While it is preferred to heat the tracks with a laser beam, it is considered that other means such as an electron beam or an electric spark heating technique may be used. Surface contact heating is an alternative to pattern heating by an energy beam. This comprises pressing a heated patterned element or "branding iron" against the magnet to locally heat the magnet by conduction.

The embodiments of the invention in which an exclusive property or privilege is claimed are defined as follows:

1. A method of imparting a magnetic pattern to an unmagnetized bulk permanent magnet material comprising the steps of:
   directing energy in a pattern onto unmagnetized base permanent magnet bulk material to heat a volume of the material to a threshold temperature to lower the coercivity thereof;
   selectively magnetizing the heated pattern by imposing on the pattern of a magnetic field stronger than the coercivity of the heated volume and not strong enough to significantly magnetize the unheated material; and
   allowing the material to cool in said magnetic field, whereby the treated pattern generates a magnetic flux density which is readily detected by a magnetic sensor.

2. The invention as defined in claim 1 wherein the pattern is formed by sequentially directing energy onto different surface areas and the step of imposing a magnetic field includes maintaining the same magnetic field direction for each area being heated to thereby yield a pattern of magnetized regions all of the same polarity.

3. The invention as defined in claim 1 wherein the pattern is formed by sequentially directing energy onto different surface areas and the step of imposing a magnetic field includes changing the polarity of the magnetic field in accordance with the desired polarity of each area being heated to thereby yield a treated pattern having both north and south poles at the surface of the material.

4. The invention as defined in claim 1 wherein the step of directing energy onto the surface comprises writing on the surface with a controlled energy beam which affects the magnetization of the underlying volume.

5. The invention as defined in claim 1 wherein the step of directing energy onto the surface to heat the material in a pattern comprises directing an energy beam onto the surface and relatively moving the surface and the energy beam.

6. The invention as defined in claim 1 wherein the step of directing energy onto the surface to heat the material in a pattern comprises directing an energy beam onto the surface in discontinuous areas and relatively moving the surface and the energy beam to produce a pattern of separate magnetically distinct areas.

7. The invention as defined in claim 1 wherein the step of directing energy onto the surface to heat the material in a pattern comprises directing an energy beam onto the surface, relatively moving the surface and the energy beam, and varying the power density of the energy beam to vary the depth of the treated pattern and the magnetic flux density generated by the pattern.

8. The invention as defined in claim 7 wherein the power density of the energy beam is varied continuously as the beam and surface relatively move to produce a pattern in the material having a varying flux density along the pattern.

9. The invention as defined in claim 1 wherein the step of directing energy onto the surface to heat the material in a pattern comprises directing an energy beam onto the surface, relatively moving the surface and the energy beam, and varying the rate of relative movement to vary the depth of the treated pattern and the magnetic flux density generated by the pattern.

10. The invention as defined in claim 1 wherein the step of directing energy onto the surface to heat the material in a pattern comprises directing an energy beam onto the surface, relatively moving the surface and the energy beam, and varying the strength of the magnetic field to vary the magnetic flux density generated by the pattern.

11. The invention as defined in claim 1 wherein energy is directed onto the surface by a laser beam.

* * * * *